Nov. 19, 1963  E. BECK  3,110,930
APPARATUS FOR PRODUCING PLASTIC FILAMENTS
Filed April 18, 1961
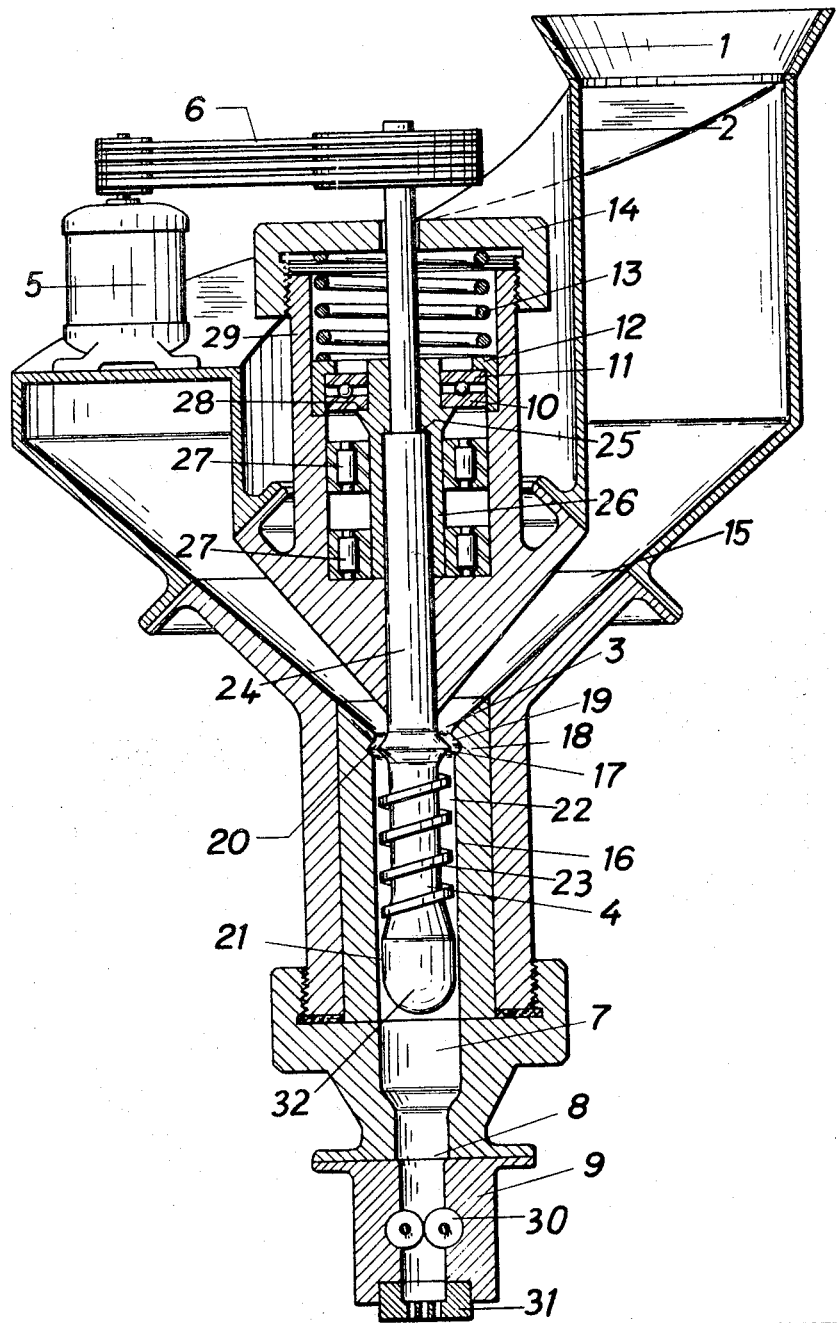
INVENTOR.
Erich Beck
BY
*Tennie, Edmonds, Morton, Barrows & Taylor*
ATTORNEYS

United States Patent Office 3,110,930
Patented Nov. 19, 1963

3,110,930
APPARATUS FOR PRODUCING PLASTIC FILAMENTS
Erich Beck, Goeggingen, Germany, assignor to Alpine Aktiengesellschaft, Maschinenfabrik und Eisengiesserei, Augsburg, Germany, a company of Germany
Filed Apr. 18, 1961, Ser. No. 103,767
Claims priority, application Germany May 27, 1960
11 Claims. (Cl. 18—8)

This invention relates to the production of endless plastic filaments, either a single one or a plurality of the same (bundles) according to the combined melting-up and spinning method employed, and to an apparatus therefor of especially advantageous construction, comprising a screw extruder followed by a spinning pump unit and provided with means allowing the pressure of the molten mass available between the discharge end of the screw and the spinning pump unit to be adjusted and controlled in a simple manner.

It is generally known that, for spinning fusible plastic material, use can be made of devices which comprise a so-called measuring (metering) pump, such as a gear pump. The pressure (inlet pressure) required for the measuring (metering) pump is produced by means of a pressure pump featured by a slip, i.e. a pump that, with throughput rate varying, constantly provides a positive pressure. In recent times, however, preference is frequently being given to heated screw extruders which produce the pressure needed and serve at the same time the purpose of melting up the raw material introduced in granular state. As far as the last named devices are concerned, the amount of pressure produced is more or less dependent on the screw speed and the throughput rate.

The primary object of the present invention is to ensure, in a simple manner, the adjustment and control of the pressure exerted by the molten mass of plastic material available between the discharge end of the screw and the spinning pump, independent of screw speed and throughput rate.

In accordance with the present invention, the screw is supported, so as to be easily displaceable, in a longitudinal bearing, one end of which is in close contact with a spring, said screw being in equilibrium with the power of the spring. Provisions have been made on the screw allowing the rate of granulate feed introduced to said screw to be altered by displacing the latter in lengthwise direction. The word "granulate" as used in this conjunction refers to all plastic raw materials in their feeding state suitable for producing endless filaments, either a single one or even a plurality (bundle) of the same.

In order to alter the amount of granulate being introduced by displacing the screw in lengthwise direction, the part of the screw core immediately beneath the annular intake opening for the granulate can, for example, be widened and the respective portion of the screw bushing broadened adequately with a view to matching that bulge on the core. In this way a throttle is provided, the gap width of which, when the screw is displaced, becomes larger or smaller according to the alteration of the pressure exerted by the molten plastic mass available between the discharge end of the screw and the spinning pump. If the pressure of the molten mass at that location increases, the gap width of the throttle decreases or is reduced and, as a result, the amount of the plastic mass being introduced decreases. If, on the other hand, the pressure at that location decreases, the throttle gap widens and the amount of plastic mass introduced necessarily increases.

Should the screw be displaced in an upward or rearward direction as a result of an increase in the pressure exerted by the molten mass available between the discharge end of the screw and the spinning pump, the feeding of granulate to the screw is throttled while the spinning pump continues delivering the melted plastic mass at a constant rate. As a result, the pressure of the molten plastic mass between the discharge end of the screw and the spinning pump decreases, the screw is forced forward or downward by the pretensioned spring and a large amount of granulate is fed in again. Thus, the once adjusted pressure of the molten mass at the intake end of the spinning pump will be self-regulating constantly so that, in the ways as described above, automatic regulation of the pressure exerted by the molten mass has been made possible.

The apparatus according to the present invention enables adjustment of the pressure of the molten plastic mass available between the discharge end of the screw and the spinning pump in adaptation to the characteristics of the material to be handled by altering the pretension of the spring, for instance, by means of a cap nut.

Screws displaceable in lengthwise direction, as well as throttles, the gap width of which can be altered by dislocating the screw longitudinally have already been known, but only for other applications and for purposes distinctly different from those of the present invention. Suggestions have also been made for providing devices operating with a screw extruder and a measuring (metering) pump fitted with a regulating chamber to be arranged at the intake end of or in a side channel of the measuring pump, this regulating chamber bordered at one end by a plunger fitted with a pretensioned spring and actuating the regulating device in the feed system. Though the last named devices present considerable advantages over the devices known hitherto, they are, if compared with the very simple automatic apparatus according to the present invention, complicated and subject to troubles.

In contradiction to all known spinning devices for molten plastic masses which comprise a screw extruder and a spinning pump, the apparatus according to the present invention offers, in addition to its simple construction, the great advantage that the once adjusted pressure of the molten mass available at the intake end of the spinning pump remains substantially constant.

As suggested furthermore, it is useful to employ a screw extruder of the high speed, adiabatically operating type, as it provides a high throughput rate and a thorough, fast melting-up of the plastic mass, obviating in this way any special heating device with its drawbacks, that are, for instance, long dwelling (retention) time, complicated construction and the like.

Owing to the short dead period and to the automatic adaptation of the heat generated to the actual rate of feed introduced, the regulating efficiency is greater than with the conventional slow speed extruders.

According to the general understanding, an adiabatically operating screw extruder is a screw extruder in which the heat required for melting up the plastic material is furnished via the driving energy, that means, with no heat being supplied from the outside; mechanical energy is converted to frictional heat owing to the screw rotating within the plastic mass inside the screw bushing.

As recommended in addition, it is advantageous for further homogenizing to design the throttle provided at the discharge end of the screw in such a way that its width remains constant while the screw is displaced in the lengthwise direction.

A detailed description of the improved apparatus for producing plastic filaments is provided hereinafter in conjunction with the accompanying drawing of which the single FIGURE is a schematic vertical sectional view through an extruder apparatus shown by way of an example of an embodiment in accordance with the present invention.

Referring to the drawing, the granulate to be melted and extruded is fed into the apparatus through a hopper 1 into an annular feeding funnel 2 which connects with an annular tapered channel 15 in the body of the extruder. The channel 15 terminates in an annular intake opening 3 at the top of a generally-cylindrical chamber 22 in a screw bushing 16. A high speed screw 4 having a projecting thread 23, as shown, is located in the chamber 22 and is carried on an integral shaft 24 extending upwardly through the body of the apparatus where it carries a V-belt pulley driven by V-belt 6 from an electric motor 5 mounted on the upper surface of the annular feeding channel 2.

The granulate is delivered into the chamber 22 of the screw bushing 16 above the thread of the screw and is melted up by the action of the high-speed screw 4 in a well known manner by the conversion of mechanical energy to heat. The resulting molten mass of granulate is forced through an annular throttle gap 21 into a channel 7 in the lower portion of the apparatus below the screw 4, forming a continuation of the chamber 22. The molten mass in the channel 7 is forced through a passageway or opening 8 into a spinning pump unit 9. The spinning pump unit 9 is shown more or less diagrammatically and comprises a spinning pump 30 which operated to deliver molten plastic material forced through the opening 8 to a spinning die 31 provided with a plurality of die orifices for producing a bundle of filaments. A die may be employed which produces a single filament.

The shaft 24 above the screw 4 is provided with a shoulder 25 and is fitted in a bushing 26 which is fixed to and rotates with the shaft in a pair of spaced alignment roller bearings 27. Above these bearings the bushing 26 includes a shoulder 28 on which rests the undersurface of the lower ring 10 of a thrust ball bearing unit having a stationary upper ring 11 engaging under an inwardly-projecting flange on a vertically slidable bushing 12 located in an enlarged cylindrical portion 29 at the upper part of the body of the extruder. A compression spring 13 is mounted in the cylinder 29 with its lower end bearing on the bushing 12, while its upper end bears against the undersurface of a cap nut 14 threaded to the outer surface of the cylinder 29.

Directly at and slightly below the intake opening 3, the core of the screw 4 above the thread 23 is provided with an annular enlargement or bulge 17, shaped as shown and which is located opposite a cooperating annular groove 18 in the screw bushing 16. The bulge 17 and the broadened portion or groove 18 enclose and provide a throttle gap 19, the width 20 of which is altered when the screw 4 is displaced in its axial or lengthwise direction. When the screw is displaced in the upward direction against the force of the spring 13 due to an increase in the pressure of the molten mass in the channel 7, the width of the throttle gap 20 is reduced thereby reducing the input of granulate to the chamber 22.

After the pump 30 of the spinning unit 9 has continued to pump out the molten mass and has again reduced the pressure in the channel 7, the spring 13 responds to the reduced pressure and pushes the screw 4 in a downward direction thereby enlarging the throttle gap 20. The cap nut 14 may be threaded up or down to adjust the force of the spring 13 and consequently the pressure in the channel 7. Once the pressure of the molten mass in the channel 7 is adjusted for the particular plastic material, the arrangement is such that the pressure is automatically kept substantially constant.

The screw 4 below the thread 23 includes a bulb-shaped enlargement 32, as shown, so that a throttle gap 21 is provided between the cylindrical portion of the bulb and the wall of the chamber 16. The throttle gap 21 provides a certain amount of back pressure around the threaded portion of the screw and aids in the homogenizing and heating up of the granulate delivered to the screw. The molten mass of plastic material flows along through the annular gap 21, which is of sufficient width to accommodate maximum flow of the melted material and its width does not change when the screw is displaced axially.

The annular throttling ring 17 on the core of the screw 4 has a downward and outward sloping surface terminating abruptly in a line edge from which the downward and inward sloping surface extends, thereby facilitating flow of the granular material through the groove 18, the upper lip of which, as shown, has a slightly smaller diameter than the diameter of the screw chamber 22 below the throttling means.

Since the core or shaft 24 of the screw 4 is attached to the bushing 26, the screw is suspended and the drawing shows the screw and the associated bushing in its lowermost position with the lower end of the bushing 26 resting on the body of the extruder. When the pressure in the channel 7 overcomes the pretension of the spring 13 and acts on the lower bulb portion of the screw 4 to displace the shaft vertically, the bushing 26 slides upwardly a short distance in the roller bearing units 27. It is only necessary to displace the screw through a relatively narrow range to materially change the rate of delivery of granulate to the threaded section of the screw.

The apparatus may be used for spinning various types of plastic materials into filaments. For example, the apparatus is advantageously employed in the spinning of filaments from polyamides, polyester (terephthalic acid, ethylene glycol, polyester), low-pressure polyethylene and polypropylene.

What I claim is:

1. In an apparatus for continuously extruding plastic materials including a screw extruder comprising an extruder body, an elongated screw chamber in the body having inlet and discharge ends, a rotatable screw provided with a thread and projecting into said chamber from its inlet end, an intake opening at the inlet end of the chamber for plastic granulate material, the thread on the screw being spaced from said intake opening and the screw having a thrust in a direction toward the inlet end of the chamber, alignment bearings in the body of the extruder on the side of the inlet opening opposite the screw chamber, said screw including a shaft mounted in the alignment bearings, a thrust bearing mounted on the shaft, resiliently-acting means acting on the thrust bearing and biasing the shaft and screw axially in a direction opposite to the direction of thrust of the screw, and a variable feed control means located between the thread of the screw and the inlet opening responsive to the action of the resiliently-acting means and the pressure of the plastic material at the discharge end of the chamber for varying the rate of feeding plastic granulate material to the screw in the chamber.

2. Apparatus as claimed in claim 1, in which the extruder is a high-speed adiabatically operating screw extruder.

3. Apparatus as claimed in claim 1, in which the means for varying the rate at which granulate is fed to the screw chamber comprises a throttle in advance of the thread of the screw including an annular bulge around the core of the screw located opposite an annular groove in the wall of the screw chamber, and in which the intake opening is an annular intake opening for granulate on the side of the throttle opposite the threads of the screw.

4. Apparatus as claimed in claim 1, including a throttle along the discharge end portion of the screw following the thread thereof, the throttle gap of which remains unchanged during the displacement of the screw in the lengthwise direction.

5. In a screw extruder including an extruder body, a cylindrical screw chamber and a screw projecting from one end of the chamber into the chamber, an annular intake for plastic granulate material at the inlet end of the screw in the chamber, a screw thread on the screw in the chamber spaced from said inlet, said screw including a shaft mounted in alignment bearings in the body of the extruder, a thrust bearing mounted on the shaft, a pretensioned spring acting on the thrust bearing and biasing the shaft and screw axially in a direction opposite to that of the thrust of the screw, and a variable throttle means located between the thread of the screw and the annular inlet opening, the throttle opening of which varies with the axial displacement of the screw and shaft.

6. An apparatus as claimed in claim 5, in which the throttle means comprises an annular projection on the screw opposite an annular groove in the inner wall of the screw chamber.

7. An apparatus as claimed in claim 5, in which the projecting end of the screw beyond the thread in the screw chamber comprises a bulb-like enlargement having an outer surface of maximum diameter spaced with respect to the wall of the screw chamber and providing an annular throttle passageway of constant width which remains the same during the axial displacement of the screw in the screw chamber.

8. An apparatus as claimed in claim 5, including a bushing attached to the shaft at the position of the alignment bearings and thrust bearing, said bushing having a projecting shoulder on which the thrust bearing rests.

9. An apparatus as claimed in claim 5, in which the extruder includes a bushing insert having an axially-extending cylindrical chamber forming the screw chamber, the end of the bushing at the inlet end of the screw chamber having a flaring annular surface forming a part of the annular inlet to the screw chamber.

10. An apparatus as claimed in claim 5, including means for adjusting the pretension of the spring.

11. In an apparatus for continuously producing endless filaments from plastic materials including a screw extruder and a spinning pump into which the extruder discharges, the extruder comprising an extruder body, an elongated screw chamber in the body having inlet and discharge ends, the latter of which is connected by a passageway with the spinning pump, a rotatable screw projecting into said chamber from its inlet end, an intake opening at the inlet end of the chamber for plastic granulate material, said screw having a thread in the chamber spaced from said inlet and having a thrust in a direction toward the inlet end of the chamber, said screw including a shaft mounted in alignment bearings in the body of the extruder adjacent the inlet end of the chamber, a thrust bearing mounted on the shaft, resiliently-acting means acting on the thrust bearing and biasing the shaft and screw relative to the chamber axially in the direction of the spinning pump and opposite to the direction of thrust of the screw, and a variable throttle means located between the thread of the screw and the inlet opening responsive to the action of the resiliently-acting means and the pressure of the plastic material in said passageway for varying the rate of feeding plastic granulate material to the screw in the chamber.

References Cited in the file of this patent

UNITED STATES PATENTS

| | | |
|---|---|---|
| Re. 23,880 | Heston | Sept. 28, 1954 |
| 1,533,191 | Kaiser et al. | Apr. 14, 1925 |
| 2,407,503 | Magerkurth | Sept. 10, 1946 |
| 2,411,971 | MacMillan et al. | Dec. 3, 1946 |
| 2,692,405 | Gaylor | Oct. 26, 1954 |
| 2,707,306 | Weber et al. | May 3, 1955 |

FOREIGN PATENTS

| | | |
|---|---|---|
| 1,099,996 | Germany | Feb. 23, 1961 |